United States Patent
Colonques et al.

(10) Patent No.: US 10,541,829 B2
(45) Date of Patent: Jan. 21, 2020

(54) NETWORK DEVICES FOR SCALABLE POINT TO MULTIPOINT NETWORKS

(71) Applicant: Marvell World Trade Ltd., St. Michael (BB)

(72) Inventors: Xavier Vicent Colonques, Betxi (ES); Santiago Vicent Colonques, Vilareal (ES)

(73) Assignee: MARVELL WORLD TRADE LTD., St. Michael (BB)

( * ) Notice: Subject to any disclaimer, the term of this patent is extended or adjusted under 35 U.S.C. 154(b) by 332 days.

(21) Appl. No.: 15/423,527

(22) Filed: Feb. 2, 2017

(65) Prior Publication Data
US 2017/0222827 A1    Aug. 3, 2017

Related U.S. Application Data

(60) Provisional application No. 62/290,012, filed on Feb. 2, 2016.

(51) Int. Cl.
*H04L 12/28* (2006.01)
*H04L 12/911* (2013.01)
*H04L 12/707* (2013.01)

(52) U.S. Cl.
CPC ........ *H04L 12/2861* (2013.01); *H04L 47/782* (2013.01); *H04L 47/826* (2013.01); *H04L 45/24* (2013.01)

(58) Field of Classification Search
CPC ....... H04B 10/27; H04B 3/54; H04L 12/2834; H04L 12/2861; H04L 12/6418;
(Continued)

(56) References Cited

U.S. PATENT DOCUMENTS

2013/0051220 A1* 2/2013 Ryshakov
2014/0086580 A1* 3/2014 Griswold et al.
2014/0186039 A1* 7/2014 Luo et al.

FOREIGN PATENT DOCUMENTS

WO    WO2013173665 A1    11/2013

OTHER PUBLICATIONS

Oksman et al., "G.hn: The New ITU-T Home Networking Standard", IEEE Communications Magazine, Oct. 1, 2009, pp. 138-145.
(Continued)

*Primary Examiner* — Marsha D Banks Harold
*Assistant Examiner* — Dharmesh J Patel (57) ABSTRACT

The present disclosure includes systems and techniques relating to Point-to-Multipoint (P2MP) communication networks and G.hn networking standards used therewith. In some implementations, the system includes a domain master (DM) network device and one or more network devices. The DM network device is configured to receive control request messages from one or more network devices, establish a connection via a point-to-multipoint (P2MP) network coupling to the one or more network devices based on the received control request messages, and transmit control messages to one or more network devices via the connection. A network device is configured to receive the control messages from the DM network device, receive data from a backbone network coupled to the P2MP network coupling, and transmit the received data to a designated client device through the P2MP network coupling in accordance with a P2MP communication protocol using a resource allocation received in the control message.

29 Claims, 4 Drawing Sheets

(58) Field of Classification Search
CPC . H04L 47/782; H04L 47/826; H04L 12/4625; H04L 1/22; H04L 12/66; H04Q 11/0067
See application file for complete search history.

(56) References Cited

OTHER PUBLICATIONS

International Application No. PCT/IB2017/050577, Notification of Transmittal of the International Search Report and the Written Opinion of the International Searching Authority, dated Apr. 7, 2017, 21 pages.

* cited by examiner

NETWORK DEVICES FOR SCALABLE POINT TO MULTIPOINT NETWORKS

CROSS REFERENCE TO RELATED APPLICATIONS

This disclosure claims the benefit of the priority of U.S. Provisional Application Ser. No. 62/290,012, filed Feb. 2, 2016 and entitled "G.HN TECHNOLOGY FOR SCALABLE POINT TO MULTIPOINT NETWORKS", which is hereby incorporated by reference in its entirety.

BACKGROUND

The present disclosure relates to Point-to-Multipoint (P2MP) communication networks.

G.hn is a home networking standard developed by ITU (International Telecommunications Union). The G.hn standard describes a multi-node network (similar to a Wi-Fi network) that shares a channel (power line, phone line or coax cable). A network is known as a "domain" in the standard. A multi-node domain is controlled by a single node called Domain Master (DM) in a point to multipoint network configuration. In some existing networking topologies using G.hn technology, the maximum number of nodes supported in the network is limited by the capability of the node acting as the DM. As an example, current hardware implementations of a DM supports up to 15 connections using physical couplings, such as ports. Consequently, the maximum number of devices in a network domain is 16 (i.e., 1+15=16). However, in some cases it is desirable for some network architectures to support more nodes, for example customer premises equipment (CPE), than is supported based on the DM's constraints.

SUMMARY

The present disclosure describes systems and techniques relating to Point-to-Multipoint (P2MP) communication networks and G.hn networking standards used therewith. The systems and techniques described implement various capabilities using a network device (e.g., at the Medium Access Control layer), namely a subordinate domain manager (SDM), to support a scalable number of nodes in a P2MP network, for example. The use of a subordinate domain manager overcomes various limitations that are inherent in conventional repeaters and obviates the necessity of repeaters in some P2MP communication networks.

According to an aspect of the described systems and techniques, a network device includes: a plurality of ports coupling the network device to two or more client devices via a point-to-multipoint (P2MP) network coupling; a control path receiver configured to receive control messages from a domain master (DM) network device coupled to the network device, the network device configured to communicate with the two or more client devices over the P2MP network coupling based on the received control messages; a data path receiver configured to receive data from a backbone network coupled to the P2MP network coupling to form a hybrid P2MP network, the received data designating a destination client device to receive the data and being arranged in a format that is compliant with a backbone communication protocol; and a data path transmitter configured to transmit the received data to the designated client device through the P2MP network coupling in accordance with a P2MP communication protocol using a resource allocation received in the control message.

Particular implementations of the network device may include one or more of the following features. The network device further comprises processing circuitry configured to process the received control messages, wherein the received control messages are received from the DM network device in a G.hn compliant control message format. The processing circuitry is further configured to determine allocation of resources provided by the network device based on the received control messages in order for the network device to communicate with the two or more client devices over the P2MP network coupling. The processing circuitry is configured to process the received control messages, wherein the received control messages are received from the DM network device in an Ethernet compliant control message format. The network of device further comprises an additional port coupling the network device to the DM network device, wherein the DM network device and the network device are both disposed in the same hardware equipment. The network device further comprises an additional data path receiver configured to receive additional data transmitted from a client device of the two or more client devices via the P2MP network coupling in accordance with the P2MP communication protocol; and an additional data path transmitter configured to transmit the additional data to the backbone network, the additional data being arranged in a format that is compliant with the backbone communication protocol. The data path transmitter is configured to transmit the received data in accordance with a G.hn compliant communication protocol; and the data path receiver is configured to receive the data being arranged in a format that is compliant with an Ethernet compliant communication protocol. The network device further comprises a converter configured to convert the data that is received at the network device according to the backbone communication protocol to the P2MP communication protocol suitable for transmission to a client device via the P2MP network coupling, and to convert data that is received at the network device according to the P2MP communication protocol to a format that is compliant with the backbone communication protocol for transmission over the backbone network. The control messages comprise a Medium Access Plan (MAP) defining shared transmission opportunities that are split into predefined time slots, the predefined time slots comprising a time slot corresponding to a transmission time for transmitting the received data to the designated client device; and the data path transmitter is configured to transmit the received data to the designated client device during the time slot.

According to another aspect of the described systems and techniques, a domain master (DM) network device includes: a plurality of ports coupling the DM network device to two or more client devices via a point-to-multipoint (P2MP) network coupling; an additional port coupling the DM network device to one or more network devices via the P2MP network coupling; a control path transmitter configured to transmit control messages to the one or more network devices coupled to the DM network device; and a control path receiver configured to receive control request messages from the one or more network devices coupled to the DM network device, the DM network device configured to establish a connection to the one or more network devices using the additional port and based on the received control request messages.

Particular implementations of the DM network device may include one or more of the following features. The DM network device further comprises a data path receiver configured to receive data from a backbone network coupled to the P2MP network coupling to form a hybrid P2MP network, the received data designating a destination client device to receive the data and being arranged in a format that is compliant with a backbone communication protocol; and a data path transmitter configured to transmit the received data to the designated client device through the P2MP network coupling in accordance with a P2MP communication protocol using a resource allocation in the transmitted control messages. The control messages comprise a Medium Access Plan (MAP) defining shared transmission opportunities that are split into predefined time slots, the predefined time slots comprising a time slot corresponding to a transmission time for transmitting the received data to the designated client device; and the data path transmitter is configured to transmit the received data to the designated client device during the time slot. The control path receiver is configured to receive additional control request messages from a plurality of additional network devices. The DM network device is configured to control access by the plurality of additional network devices to use the P2MP network coupling based on the received additional control request messages. The DM network device further comprises processing circuitry configured to generate the transmitted control messages, wherein the transmitted control messages are transmitted to the one or more network devices in a G.hn compliant control message format. The DM network device further comprises processing circuitry configured to generate the transmitted control messages, wherein the transmitted control messages are transmitted to the one or more network devices in an Ethernet compliant control message format.

According to yet another aspect of the described systems and techniques, a method includes receiving, by a network device, control messages from a domain master (DM) network device, the control messages specifying resource allocations for communicating with two or more client devices over a P2MP network coupling; receiving, by the network device, data from a backbone network coupled to the P2MP network coupling, the received data designating a destination client device to receive the data and being arranged in a format that is compliant with a backbone communication protocol; and transmitting, by the network device, the received data to the designated client device through the P2MP network coupling in accordance with a P2MP communication protocol using a resource allocation received in the control message.

Particular implementations of the method may include one or more of the following features. Receiving, by the network device, the control messages comprises receiving the control messages from the DM network device in a G.hn compliant control message format. Receiving, by the network device, the control messages comprises receiving the control messages from the DM network device in an Ethernet compliant control message format. The method further comprises determining allocation of resources provided by the network device based on the received control messages in order for the network device to communicate with the two or more client devices over the P2MP network coupling. The method further comprises receiving additional data transmitted from a client device of the two or more client devices via the P2MP network coupling in accordance with the P2MP communication protocol; and transmitting the additional data to the backbone network, the additional data being arranged in a format that is compliant with the backbone communication protocol. The method further comprises converting the additional data that is received according to the P2MP communication protocol to a format that is compliant with the backbone communication protocol for transmission over the backbone network. Receiving, by the network device, the data from the backbone network comprises receiving data arranged in a format that is compliant with an Ethernet compliant communication protocol; and transmitting, by the network device, the received data to the designated client device comprises transmitting the received data in accordance with a G.hn compliant communication protocol. The method further comprises converting the data that is received at the network device according to the backbone communication protocol to the P2MP communication protocol suitable for transmission to a client device via the P2MP network coupling. Receiving, by the network device, control messages from the DM network device comprises receiving a Medium Access Plan (MAP) defining shared transmission opportunities that are split into predefined time slots, the predefined time slots comprising a time slot corresponding to a transmission time for transmitting the received data to the designated client device; and transmitting, by the network device, the received data to the designated client device comprises transmitting the received data to the designated client device during the time slot.

Additionally, accordingly to an aspect of the described systems and techniques, a method includes receiving, by a domain master (DM) network device, control request messages from one or more network devices; establishing a connection via a point-to-multipoint (P2MP) network coupling to the one or more network devices based on the received control request messages; and transmitting, by the DM network device, control messages to one or more network devices via the connection.

Particular implementations of the method may include one or more of the following features. The method further comprises receiving data from a backbone network coupled to the P2MP network coupling, the received data designating a destination client device to receive the data and being arranged in a format that is compliant with a backbone communication protocol; and transmitting the received data to the designated client device through the P2MP network coupling in accordance with a P2MP communication protocol using a resource allocation in the transmitted control messages. Transmitting, by the DM network device, the control messages comprises transmitting a Medium Access Plan (MAP) defining shared transmission opportunities that are split into predefined time slots, the predefined time slots comprising a time slot corresponding to a transmission time for transmitting the received data to the designated client device; and transmitting the received data to the designated client device comprises transmitting the received data to the designated client device during the time slot. The method further comprises receiving additional control request messages from a plurality of additional network devices; and controlling access by the plurality of additional network devices to use the P2MP network coupling based on the received additional control request messages. Transmitting, by the DM network device, the control messages comprises transmitting the control messages to the one or more network devices in a G.hn compliant control message format. Transmitting, by the DM network device, the control messages comprises transmitting the control messages to the one or more network devices in an Ethernet compliant control message format.

Systems and techniques that are described herein have resulted in one or more of the following advantages. Functions and capabilities of the SDM, in accordance with embodiments described herein, realize a solution to current limitations on the maximum number of nodes that are supported in existing P2MP networks. The use of SDMs supports scalability of the P2MP network topology (particularly with regard to adding CPE devices to a P2MP network), thereby allowing the number of dedicated devices and resources of each network segment to be dynamically adjusted to suit the operational, consumption, and service requirements (e.g., the number of customers). In accordance with embodiments of the techniques and systems described below, data is communicated via P2MP transmission media, such as G.hn, directly to CPEs using an SDM disposed on an interface between a data transmission backbone, such as Ethernet, and the P2MP transmission media. The SDM obviates the need to repeat the transmission of all data using the DM and reduces the potential of signal degradation associated with repeating transmissions. Moreover, in embodiments, G.hn transmission media is not utilized to convey data between the SD and the DM, as such, the SDM does not impact throughput and latency of the P2MP network. In fact, various functions and capabilities of the SDM, as described in detail herein, improve the throughput and latency of the P2MP network, thereby improving overall network performance. Also, the systems and techniques described implement a Medium Access Control (MAC) scheduling procedure, utilizing the SDM role, which reduces the amount of time wasted within a shared transmission opportunity and improves network performance.

The SDM, as described, functions to extend the physical connections supported by the head end (HE). Additionally, further capabilities of the disclosed SDM includes operating as backup DM in case of a DM failure, thus providing the system reliability benefits associated with hardware redundancy.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1:
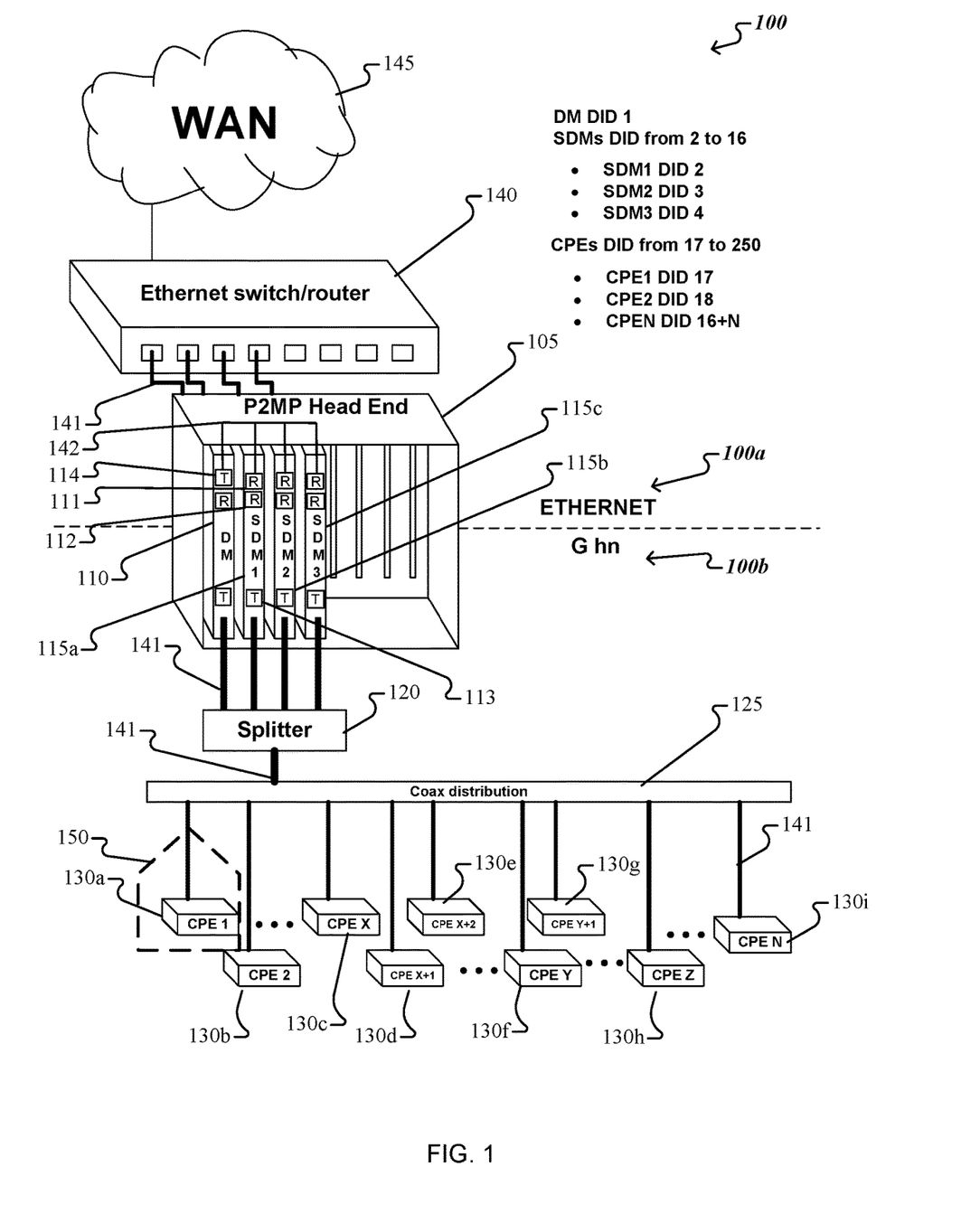
FIG. 1 shows a block diagram of an example of a hybrid P2MP communication system using G.hn technology and including the SDM role as described.

FIG. 1 shows an example of a hybrid P2MP network 100 using G.hn technology and including the SDM role. As an example, the hybrid P2MP network 100 is a telecommunications network that is generally described as having a home networking architecture and functionality in accordance with an ITU standard, for example an ITU-T G.9960 home networking standard. The hybrid P2MP network 100 is illustrated as including two main segments; network segment 100a configured, in the embodiment seen, for communicating in accordance with an Ethernet compliant communication protocol; and network segment 100b configured, in the embodiment seen, for communicating in accordance with a G.hn compliant communication protocol.

FIG. 1 illustrates the segment 100a of the hybrid P2MP network depicted as including an Ethernet switch/router 140. The Ethernet switch/router 140 is coupled to a wide area network (WAN) 145, such as the Internet, and the P2MP Head End (HE) 105 using transmission mediums 141, such as electrical wiring. In an embodiment, the P2MP HE 105 is implemented as network equipment managed by a communications service provider, for example. The head end functions as connection to the distribution infrastructure, or backbone, of the hybrid P2MP network 100. A backbone of a communications network is generally described as a portion of a computer network that interconnects various pieces of network providing a path for the exchange of information between different LANs or networks. In an embodiment, the backbone is an Ethernet network. For example, P2MP HE 105 connects the CPEs 130a-130i to the backbone, with the P2MP HE 105 and CPEs 130a-130i making up one LAN and the backbone connects this LAN to other networks. Some existing home networking architectures, based on ITU home networking standard, comprise one or more domains, and bridges to access additional communication networks, such as Wi-Fi, Ethernet, Digital Subscriber Line (DSL), or Passive Optical Network (PON) access networks.

In FIG. 1, network segment 100b of the hybrid P2MP network 100, is illustrated as including multiple nodes, for example P2MP HE 105 and CPEs 130a-130i, that are configured to transmit and receive data at the physical layer using P2MP communications, or through an inter-domain bridge above the physical layer. The P2MP network illustrated in FIG. 1 includes segment 100b that is implemented using the G.hn standard. In the embodiment, network 100 is configured to use one domain with a plurality of G.hn compliant client devices, such as CPEs, connected per network. The domain is associated with a particular domain identifier (DOMAIN ID), assigned by the node, or network device, acting as the DM 110. The P2MP HE 105 manages, or otherwise controls, the CPEs 130a-130i coupled to the hybrid P2MP network 100, in an embodiment.

As shown in FIG. 1, multiple client devices, illustrated as CPEs 130a-130i are connected to the hybrid P2MP network 100. For example, a CPE, such as CPE 130a, is a network end node in the domain, and is implemented as electronic equipment located at a subscriber's premises 150 (physical location) rather than on the service provider's premises. CPEs 130a-130i are any suitable device such as, for example, telephone handsets, set-top boxes, home gateways, DSL routers, and the like. In a P2MP network, support for a full mesh topology allowing for direct communication between all nodes in the network, such as the case in a multipoint-to-multipoint network, is not a requirement. Consequently, in the hybrid P2MP network 100, CPEs communicate through the DM, however direct communications between the CPEs 130a-130i is neither supported nor permitted.

CPEs 130a-130 are configured in an embodiment to include transceivers communicating data over a wired interface, or transmission medium 141, using G.hn technology, via a SDM or DM, and one or more suitable wired transmission mediums. In the embodiment of FIG. 1, a coaxial cable distribution medium 125 is depicted as the transmission medium. Other suitable wired transmission mediums include, without limitation, copper pairs for telephone wiring, power-line wiring, glass or plastic optical fibers, and any suitable combinations of these. FIG. 1 illustrates CPEs 130a-130i as receiving signals from the P2MP HE 105, through splitter 120. The signals are subsequently distributed using a plurality of G.hn transmission mediums 131 supporting G.hn connections to the network.

In some cases, P2MP HE 105 is coupled to a communications network having resources and services operated by the service provider, and utilized by the clients, or subscribers with equipment connected to the hybrid P2MP network 100. The P2MP HE 105 is used to manage communications, such as distribution of content, to the CPEs 130a-130i and is located at the demarcation point established at a central operator's location (e.g., building, complex). In some cases, P2MP HE 105 is configured as a central facility that provides communication services to multiple subscribers. As an example, signals from the P2MP HE 105 are transmitted downstream to CPEs over a P2MP network coupling, such as channels of the coaxial distribution 125, and are received at one of the multiple CPEs 130a-130i that correspond, for example, to a destination subscriber.

The P2MP HE 105 is implemented as electronic equipment that includes multiple network devices respectively serving as nodes in a domain of the hybrid P2MP network 100. FIG. 1 illustrates a P2MP HE 105 comprising DM 110, SDM1 115a, SDM2 115b, and SDM3 115c. Each of the network devices at the P2MP HE 105, namely the DM 110 and SDMs 115a-115c, are implemented as network devices having suitable control circuitry and signal processing circuitry for receiving and transmitting signals via the hybrid P2MP network 100. In some implementations, the control circuitry employs suitable hardware and/or software components for performing various operations including control, packet processing, and distribution of data, such as network traffic, messages and frames, communicated via the hybrid P2MP 100. In addition, in some embodiments software elements include non-volatile memory instructions (e.g., firmware) that are configured to run on suitable programmable processor(s) and associated memories. Moreover, in an embodiment, the DM 110 and SDMs 115a-115c include a plurality of coupling mechanisms, such as ports, so as to support connections to the network, other devices, and transmission media. In an example, the DM 110 includes an Ethernet compliant port coupling DM 110 to an Ethernet compliant switch/router 140. According to an implementation, the DM 110 and SDMs 115a-115c include data conversion circuitry implementing a media converter that is configured to convert data between various communication protocols. In an example, data conversion circuitry converts data that is passed between segments of the hybrid P2MP network from a suitable backbone protocol to a suitable P2MP protocol, or vice versa, for instance between an Ethernet compliant protocol and a G.hn compliant protocols. For example, SDM1 115a receives data from the backbone of the hybrid P2MP network 100 in accordance with an Ethernet protocol, and employs the data conversion circuitry to appropriately convert the data received over the Ethernet connection to a format suitable for retransmission over G.hn media to $CPE_{x+2}$ 130e. In an embodiment, the converter circuitry is implemented as an adaptor that utilizes G.hn technology and Ethernet technology to provide communication from a network, such as the Internet, over the electrical wiring coupled to a CPE, such as coaxial cables. As an example, the converter circuitry is configured to accept Ethernet frames and encapsulate them into G.hn MAC service data units (MSDUs). Thus, the converter circuitry is configured to establish a bridge providing compatibility between Internet traffic, for example, and the P2MP connections (e.g., coaxial) to network devices.

In accordance with an embodiment, the DM 110 controls, or otherwise manages, scheduling the transmissions of all the nodes in the network to avoid collisions in the channel and to guarantee a required level of quality of service (QoS) to the traffic conveyed in the domain. At any given time, only one node is allowed to act as the DM 110 for a domain. All other nodes within the domain are managed (coordinated) by DM 110. The DM 110 controls operation of the nodes in the domain. As shown in FIG. 1, the DM 110 is configured to utilize a control path connection 142, which is a transmission medium over which control/management messages for G.hn resource allocation, for example, are conveyed by the DM 110 to various SDM devices in the P2MP HE 105. In some cases, control path connection 142 is implemented as a bus. The control path connection 142 is illustrated as coupling a control path transmitter 114 of the DM 110 to each of the control path receivers 111 located at each of the respective SDMs 115a-115c. The control paths implemented within the P2MP HE 105 are dedicated to communicating control signals, which comprise flows of control/management frames between the DM 110 and SDMs 115a-115c, distinctly and separately from data signals. In some implementations, only control/management frames are transferred between DM 110 and SDMs 115a-115c, with no data frames being transferred over the control path connection 142. In some embodiments, the control path connection 142 is implemented using G.hn connections for communicating G.hn specific control/management frames. In some embodiments, the control path connection 142 is implemented using Ethernet compliant connections, and the messages are received in an Ethernet compliant control message format.

Figure 2A:
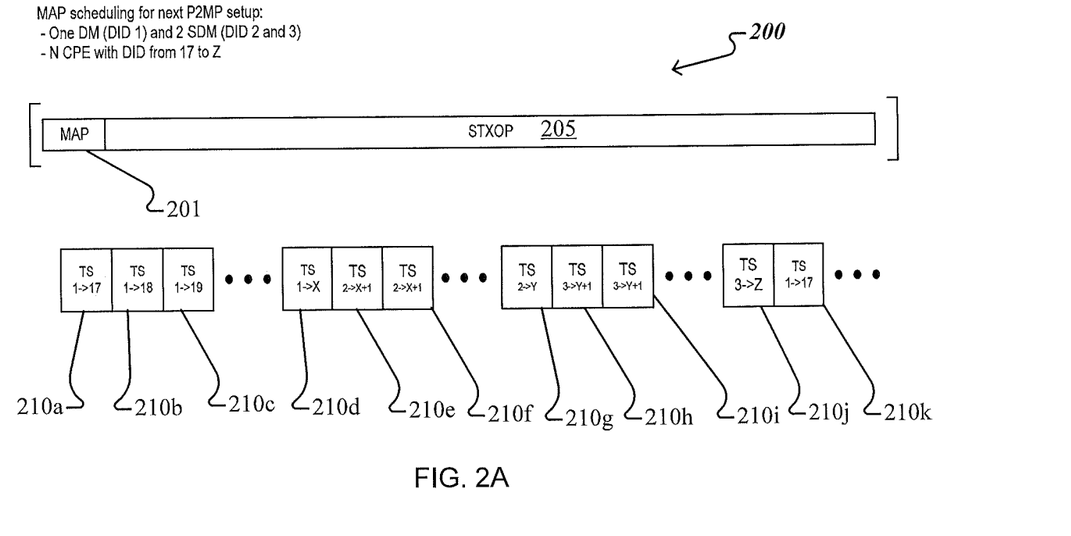
FIG. 2A shows a diagram of an example of a shared transmission opportunity (STXOP) implementing a MAC scheduling procedure within a P2MP network including the SDM role, such as the hybrid P2MP network of FIG. 1.

Additionally, the DM 110 is configured to implement the resource allocation and MAC scheduling techniques of the embodiments, as described in detail with reference to FIG. 2A, for example. For instance, in an implementation of resource allocation, the DM 110 generates a Medium Access Plan (MAP) (as shown in FIG. 2A). The MAP defines when a MAC cycle for a G.hn resource starts and describes the transmission opportunities (TXOPs) within the MAC cycle. The MAP includes information and parameters of the domain operation. Thereafter, the DM 110 periodically transmits, via its control path transmitter 114 as an interface to a control path, MAP frames, including the MAP, to each of the SDMs 115a-115c for efficient allocation and utilization of the G.hn resources. Also, in some cases, various transmission mediums, such as control path connection 142, are dedicated to communicating control signals to all of the nodes throughout the G.hn segment 100b, for example between SDMs 115a-115c and CPEs 130a-130i.

In some implementations, the DM 110 is configured to perform load balancing (e.g., the number of connections served by the respective SDM devices) techniques among itself and the SDMs 115a-115c. Thus, DM 110 functions implement a policy to assign the best available connection to a CPE, based on various criteria, for example. The policy involves, in an embodiment, considering the number of occupied ports for the DM 110 and SDMs 115a-115c and determining that the best available connection is provided by the device using the least number of occupied ports. Accordingly, the DM 110 assigns one of its connections, or a connection provided by a SDM to accept the CPE based on the policy. Moreover, in some implementations, the policy employed by the DM 110 involves setting a higher priority for preserving its own free connections than the respective connections of the SDMs 115a-115c. Thus, in an embodiment, the DM 110 first assigns an SDM to accept a new CPE at an available connection, before assigning one of its own available connections to accept the new CPE.

In another embodiment, the DM 110 is also configured to relocate, or otherwise re-establish, a connection between a CPE and an SDM within the P2MP HE 105. For example, if $CPE_1$ 130a is connected to the DM 110, the DM 110 is configured to re-establish this connection so as to be supported by another SDM. In continuing with the example, the DM 110 is configured to selectively release its connection to $CPE_1$ 130a, and then re-establish a connection with SDM2 115b by re-assigning $CPE_1$ 130a to be served by SDM2 115b. In some implementations, releasing a connection involves releasing a direct coupling of a specific CPE to DM 110 and then connecting a new SDM to the DM 110 in place of the CPE that was released. As previously noted, SDMs are not configured to support connections to any other SDM. Therefore, the DM 110 is able to readily relocate an already established connection with a CPE in order to accept an additional SDM (in the event that the DM does not have available connections). Additionally, in another embodiment, it is also possible to relocate a CPE connection from a first SDM 115a-115c to a different SDM 115a-115c. In some cases, the connection relocation is performed as part of a failover policy procedure, for example when one of the network devices installed within the P2MP HE 105, or a port in the network device, malfunctions.

The DM 110 is equipped with one or more additional functions, including but not limited to: admission control; determination of domain operation; bandwidth allocation; monitoring status of the domain; communication with the global master; backup master assignment; neighboring domain interference mitigation; inter-domain communication; support of communication; support of management; and support of power saving modes. Moreover, the DM 110 has the additional role of accepting new devices to the network and utilizing newly established P2MP connections. A CPE requesting to enter the network registers with the DM 110. Subsequently, the DM 110 either communicatively couples the CPE itself, or transmits a device identifier associated with a SDM that has negotiated to accept the connection.

As shown in FIG. 1, SDMs 115a-115c include circuitry to implement a control path receiver (CP-RX) 111, a data path receiver (DP-RX) 112, and a data path transmitter (DP-TX) 113. By implementing the aforementioned transmitter (Tx) and receiver (Rx) components, the SDM device as described herein, has the capability to receive Ethernet compliant traffic, while also being configured to communicate using G.hn technology. Moreover, as the SDM device of the embodiments communicates traffic formatted for both Ethernet and G.hn technology standards, data is transferred between the CPEs 130a-130i and the backbone without utilizing G.hn resources of the DM 110, and thereby improving network throughput and latency (e.g., avoiding data repeating at the DM). The DP-RX 112 is implemented as an Ethernet compliant receiver, in an embodiment, that is configured to operate in accordance with a protocol utilized by the backbone components of the hybrid P2MP network 100, for example Ethernet data link layer (Layer 2) and/or network layer (Layer 3). In the example of downstream communication (from the perspective of the SDM), the DP-RX 112 is configured to receive Ethernet data frames directly from the backbone of the hybrid P2MP network 100, for example data traffic communicated from the Ethernet switch/router 140. Subsequently, a SDM converts the Ethernet data frames into G.hn data frames and transmits the frames downstream to a respective CPE 130a-130i via the DP-TX 113. The DP-TX 113 is a G.hn transmitter designed for P2MP communications in accordance with the G.hn specification that are conveyed over various types of P2MP transmission mediums. As an example, the DP-TX 113 is configured to transmit the data traffic, previously received from the backbone via DP-RX 112, to the appropriate CPE via an established G.hn connection using P2MP transmission mediums, such as coaxial distribution 125. In this case, the path traversed by the G.hn data traffic communicated from a DP-TX 113 is characterized as a data path.

The CP-RX 111 is configured to receive control/management frames from the DM 110 using G.hn technology standards. Accordingly, the CP-RX 111 is implemented as a G.hn receiver, in an embodiment. In accordance with the techniques described, the DM 110 is configured to transmit control/management messages using CP-TX 114, as discussed in detail above, to be subsequently received by the CP-RX 111 located at one of the respective SDMs 115a-115c. The control/management frames, received by the SDM, are then processed in order to allocate P2MP, e.g. G.hn, resources of the network to be utilized by one or more of the CPEs. In an embodiment, the resources allocated include time slots during which a CPE may access the P2MP network to receive or transmit data. Although the receivers and transmitters are illustrated as separate devices, in some implementations a transceiver device is used that to provide both transmitter and receiver capabilities. In some embodiments, the DM 110 also includes receiver and transmitter circuitry as described in detail above. It is noted that in some embodiments, the DM 110 generates P2MP control information locally such that DM 110 does not necessarily require a CP-RX circuit. Conversely, DM 110 typically includes CP-TX circuitry 114, as shown in FIG. 1, that is configured to transmit control information to SDMs in the P2MP HE 105. Moreover, in some embodiments, additional transmitters and receivers provide capabilities associated with upstream communications, such as transmitting data to the backbone of the hybrid P2MP network 100 and receiving data from the CPEs 130a-130i.

In the embodiment illustrated in FIG. 1, the DM 110 and SDMs 115a-115c are mounted on the same physical network device, namely the P2MP HE 105. In this implementation, the P2MP HE 105 serves as a rack device with one or more slots having the separate DM or SDM network devices installed therein. Furthermore, the SDMs and DMs include coupling circuitry. In some implementations, the coupling circuitry is implemented as a communication port, which provides a physical connection and is configured to convey signals that have been converted into a P2MP compliant protocol, such as G.hn, in an embodiment. In some implementations, a network device included in the P2MP HE 105 includes an ITU-T G.9960 port towards the G.hn segment 100b, and an Ethernet network port towards the Ethernet segment 100a.

Accordingly, scalability of the network is readily adjustable by installing additional SDMs at the P2MP HE 105, and suitably configuring the DM, to increase the number CPEs coupled to the network. The DM is configured to control access by the additional SDMs to use the P2MP network coupling based on control request messages received from the additional SDMs. Conversely, SDMs are readily removable from the P2MP HE 105 to decrease the number CPEs coupled to the network, for example when a CPE user terminates a subscription with a data services provider. The techniques described above increases the quantity of nodes that are supportable in a network using P2MP technology, such as G.hn, without driving up costs associated with added device and system capabilities, and further providing benefits associated with reusing the devices.

In an example of operation for the hybrid P2MP network 100, the Ethernet switch/router 140 receives data from a content source that is distributed via a WAN 145, for example the Internet. In accordance with the techniques and systems described, a SDM is configured to receive data traffic, from the Ethernet switch/router 140, and the relevant control/management traffic, from the DM 110, by employing the distinct data paths and control paths. That is, a SDM converts data initially received from the Ethernet switch/router 140 in an Ethernet communication protocol using Ethernet connections and transmits the data to any of the destined CPEs 130a-130i in a G.hn protocol and using G.hn connections. As an example, data frames destined for $CPE_{x+1}$ 130d are received by the Ethernet switch/router 140 and communicated via Ethernet compliant technology, such as IEEE 802.3bm standard (e.g., 100G/40 G for optical fiber) to the SDM assigned to manage the respective destination node, namely SDM1 115a. SDM1 115a also receives control/management frames implementing resource allocation, such as a access grants for the G.hn network, from the DM 110 in accordance with G.hn compliant technology, such as the ITU-T G.9961 standard. Based on the allocation of network resources that have been negotiated and provided by the SDM1 115a, it transmits the received Ethernet compliant data frames that are converted into G.hn compliant data frames, downstream to be ultimately received by the $CPE_{x+1}$ 130d using the G.hn transmission medium such as coaxial distribution 125 and G.hn transmission medium 141.

In accordance with G.hn home networking standard, medium access is scheduled by MAC cycles continuously following one another using a transmission opportunity (TXOP), which is an interval of time during which a node or a group of nodes has the right to initiate transmission. FIG. 2A shows a diagram 200 of an example of a shared transmission opportunity (STXOP) 205, in which the transmission opportunity is to be shared between the DM and each of the SDMs in a domain, in order to complete transmission of data frames from the particular DM or SDM to their respectively managed CPEs. The (STXOP) 205 illustrated in FIG. 2A implements a MAC scheduling procedure within a P2MP network using SDMs. The data frames are transmitted during SXTOP 205 using G.hn transmission mediums between DM, SDMs, and the CPEs. Subsequently, the received data frames are processed, by the destination CPE device, for use at the application layer.

Each MAC cycle is divided into two or more time intervals, in an embodiment; one or more time intervals of which are for domain management purposes, while other time intervals are assigned as transmission opportunities (TXOPs) for different nodes or groups of nodes. As an example, in an embodiment, a time interval that is allotted for domain management purposes is assigned to the DM (shown in FIG. 1) for transmission of the MAP 201, using a MAP frame. The DM is configured to allocate (in other words schedule) TXOPs and time slots (TSs) in an embodiment. In some implementations, these allocations of TXOPs and TSs are provided in accordance with priority constraints for priority traffic and quality of service (QoS) bandwidth, latency and jitter constraints specified for the established service.

A MAC cycle includes one or more TXOPs. At least one of the time intervals allotted for domain management purposes is assigned to the DM for transmission of the (MAP) among the various SDMs and CPEs. The information transmitted by the DM in the MAP frame identifies the boundaries of the MAC cycle and includes assigned TXOPs (content of the cycle) by the DM for one or more of the following MAC cycles. In the case of downstream transmissions, each TS in the STXOP is shared, or otherwise allocated, among the DM and the SDMs. In the case of upstream transmission, if an upstream TS is not allocated or utilized by a CPE, then the STXOP time is capable to be reused to allow for a downstream transmission. In some embodiments, TSs are used for bidirectional communication (e.g., upstream and downstream), as is supported by G.hn technology.

Each STXOP 205 is determined, in an embodiment, by the DM based on the available communication resources inside the domain and communication resources and parameters required by different nodes. The DM defines the STXOPs of the MAC cycle, in an embodiment, in order to accommodate communication based on multiple variables, such as changes in medium characteristics (channel/noise parameters), changes in services, or in the number of nodes operating in the domain. According to the described techniques, the DM assigns time slots within each STXOP 205 to itself and the SDMs. Subsequently, the DM or SDM that receives an assignment to a corresponding time slot will engage in transmission with the end nodes (CPE) to which it is coupled during the transmission opportunity. End nodes synchronize with the MAC cycle by detecting the presence of a MAP message and subsequently access the medium according to the TXOPs described in the MAP 201. As discussed in detail in reference to FIG. 1, the DM is configured to determine and generate MAP 201, and accordingly transmits a MAP message including the MAP to all of the nodes within a domain, using G.hn technology. In some cases, the MAP 201 describes the allocation of each TXOP by its start-time, duration, and by the assignment of the node that transmits within the TXOPs.

The illustrated STXOP 205 is divided into one or more time slots (TSs) 210, where each TS 210 is a time interval representing an opportunity for the assigned DM or SDM to start transmitting to the appropriate CPE or set of CPEs assigned to that TS. The DM or SDM that has been assigned to a specific TS 210 either uses the opportunity to start transmitting during the TS, or pass on the opportunity to transmit, for instance in the case where there is no data for transmission. In the case of P2MP networks, CPEs are capable of transmitting in the upstream direction during an allocated TS, which is subsequently received by a DM or SDM. For the purposes of illustrations, only downstream transmission is shown and discussed, however similar procedures occur for upstream transmission.

In the example seen in FIG. 2A, the MAP 201 schedules transmission within an example of a P2MP network with a topology including a DM that is associated with device identifier (DID) 1, and two SDMs associated with DIDs 2 and 3, respectively. In the event that the transmission opportunity is not used, the next scheduled node detects a transmission preamble and the physical layer (PHY) header is demodulated. The PHY header carries frame duration information, so that the next node then knows when its TS starts. However, if no preamble is detected, then the next scheduled TS will begin after a preamble duration has passed with no detected signal.

Additionally, the network includes N number of CPEs, or end nodes, that are assigned DIDs from 17 to Z. As illustrated, TSs 210a-210d are assigned to DM as an opportunity to transmit to the its respective CPEs having DID 17 to DID X according to the example. As shown, TS 210*a* is assigned to the DM as an opportunity to transmit to CPE having DID 17. TS 210*b* is assigned to DM as an opportunity to transmit to CPE with DID 18. TS 210*c* is assigned to the DM to transmit to CPE with DID 19, and so on for each CPE managed by the DM, until TS 210*d* that is also assigned to the DM as an opportunity to transmit to the remaining CPE having DID X. As the TSs are assigned to the DM/SDMs, rather than to each CPE individually, TSs for a specific CPE are utilized only as necessary. Restated, each SDM and the DM is capable of passing on any illustrated TS to its respective CPE, thereby reducing the amount of waiting time that is associated with allocating a TS for each node in the domain. Although FIG. 2A illustrates a TS that is capable of being utilized for a respective CPE, each TS is not necessarily used for conducting transmission, and has the potential of being passed to the next SDM, or the DM, based on the scheduling defined in the MAP.

Figure 2B:
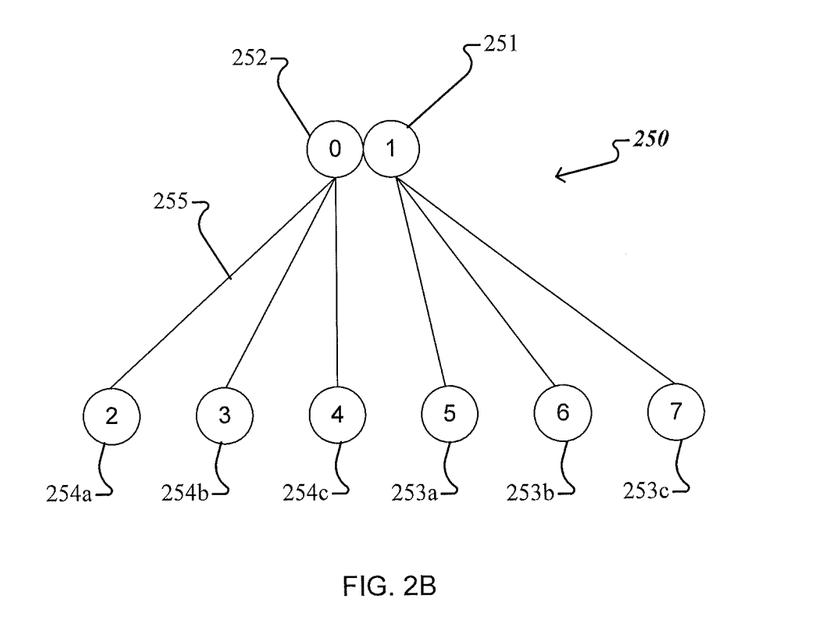
FIG. 2B shows a graph of an example of a P2MP network topology including the SDM role as described.

Subsequently, the next slots, TS 210*e*-TS 210*g* are assigned to the SDM having DID 2, each for opportunities to transmit to the respective CPEs that are supported by that SDM, namely DID X+1 to Y. Thereafter, the remaining slots, TS 210*h*-TS 210*j* are assigned to the second SDM having DID 3, each for opportunities to transmit to the respective CPEs that are supported by that SDM, namely DID Y+1 to Z (e.g., the last CPE in the network). FIG. 2B illustrates that after all of the CPEs supported in the network have had a transmission opportunity, vis-a-vis the TS assigned to its managing DM or SDM, the scheduling procedure iteratively returns to assigning slots for the DM. TS 210*k* is shown as again being assigned to the DM for an opportunity to transmit to CPE 17. In some cases, the MAP defines TSs that are not sequentially and/or evenly distributed among the DM and the SDMs, as seen in FIG. 2A. Rather the TSs are capable of being assigned as deemed necessary and suitable in accordance with constraints, for example for example priority traffic and QOS.

Thus, MAC scheduling techniques in accordance with an embodiment, employ a shared TXOP, depicted as STXOP 205, in which TSs are assigned to DMs or SDMs that support respective CPEs, rather than TSs that are assigned to each CPE individually. By assigning TXOPs to DMs and SDMs, which respectively support one or more CPE devices, latency resulting from waiting for utilization of a next transmission opportunity within the STXOP is reduced. For instance, in the case of the example P2MP network, TSs are assigned to the DM (i.e., DID 1), or either of the two SDMs (i.e., DID 2 and 3). The STXOP is split into TSs that are shared among three nodes, as opposed to requiring a specific time slot to be allotted by head end unit 105 for each node in the network FIG. 2B shows a graph or an example of a P2MP network topology 250. In accordance with the G.hn home networking standard, all nodes accepted in a domain are registered with the DM. In the example network, two SDMs (DID 0 and DID 1) and six CPEs (DIDs 2-7) are registered with the DM, which results in the network topology 250 represented by the graph in FIG. 2B. In an embodiment, to register with the DM, a CPE sends a registration request message to the DM over a control channel.

The graph represents the network topology 250 having a single domain, which is characterized by being associated with one controlling DM. Thus, by having a single DM installed for the one domain, in turn a single shared MAP (as shown in FIG. 2A) is utilized for all nodes within the domain, in an embodiment. Furthermore, transmission occurs within a STXOP defined for the single domain and one DM (in contrast to restricting transmission to separate multiple STXOPs needed for each of several DMs). The graphed network topology 250 is generally described as having a tree structure, with the SDM devices in the P2MP network being shown as root nodes 251 and 252 at the top level of the graph's hierarchy; and the corresponding CPEs, or end nodes, represented as leaf nodes 253*a*-253*c* and 254*a*-254*c* in the lower level of the graph's hierarchal structure. Node$_0$ 252 and node$_1$ 251 represent SDMs within the P2MP network which, in accordance with the techniques and systems described, provide connections, to each of its supported group of CPE devices coupled thereto, represented by connecting lines 255 to node$_2$ 254*a*, node$_3$ 254*b*, node$_4$ 254*c* and node$_5$ 253*a*, node$_6$ 253*b*, and node$_7$ 253*c* respectively. As discussed in detail with reference to FIG. 1, connections between DMs and SDMs are implemented using G.hn technology, in an embodiment. The graph illustrates a network topology using SDMs that are configured to support the scalability of the network. FIG. 2B shows that each of the two branches of the tree (having 3 end nodes respectively) are associated with one of the two root nodes, corresponding to an SDM. To increase the number of root nodes, or SDMs, additional SDMs are installed at the HE, which thereby increases the number of connected end nodes, representing CPEs in the network. For instance, adding an additional root node to the topology, provides three new connections to respectively support three new end nodes.

Figure 3:
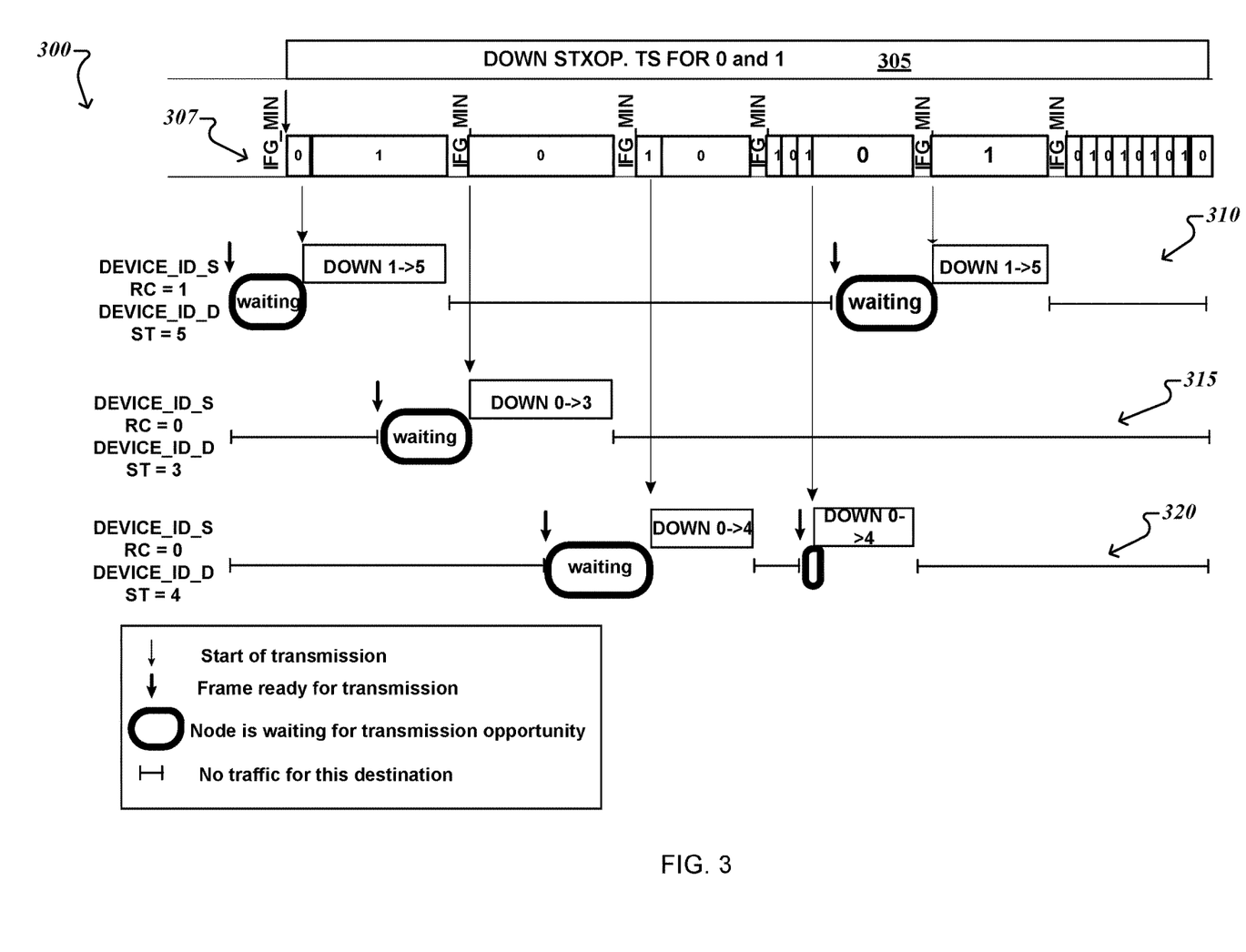
FIG. 3 shows a diagram of an example of another STXOP implementing a MAC scheduling procedure within a P2MP network topology shown in FIG. 2B.

FIG. 3 shows a timing diagram 300 of an example of another STXOP 305 implementing a MAC scheduling procedure within a P2MP network topology. Timing diagram 300 illustrates that the MAC scheduling procedure implements a mapping of the shared STXOP that is utilized by the different SDM devices to allocate transmission slots among the various CPE devices on the network. Thus, the MAC scheduling procedure realizes improved resource utilization and system efficiency, by dividing the STXOP to different SDM devices, as opposed to the CPE devices of the network. In an embodiment, the STXOP 305 is defined for the various DMs, SDMs and CPEs in control messages that are transmitted from the DM to SDMs. In the case where multiple SDMs in a domain are transmitting data traffic downstream to coupled CPEs, such as in the hybrid P2MP network seen in FIG. 1, the MAC scheduling techniques of embodiments are employed for sharing access to P2MP (for instance G.hn) transmission mediums. Accordingly, in the example network topology illustrated in FIG. 2B, STXOP 305 is an example of a shared transmission opportunity that is defined by a DM using the described MAC scheduling techniques for the nodes in the illustrated topology.

As seen in FIG. 3, STXOP 305 is divided between two SDMs that are the source of the transmissions, node$_0$ (i.e., DEVICE_ID_SRC=0) and node$_1$ (i.e., DEVICE_ID_SRC=1). Additionally, a grid of TSs 307 is depicted. In an embodiment, the TSs respectively represent time intervals for downstream transmission by a SDM to one of the respective end nodes (CPEs) to which it is coupled over the P2MP network coupling. The respective CPE is a destination for the given transmission. In an example, node$_1$ transmits to its connected node$_5$ (i.e., DEVICE_ID_DST=5) and node$_0$ transmits to its connected nodes, node$_3$ (i.e., DEVICE_ID_DST=3) and node$_4$ (i.e., DEVICE_ID_DST=4).

As illustrated, the STXOP 305 is divided into one or more TSs that are assigned to respective SDMs. The SDMs are represented by a node$_0$ and a node$_1$ in a network topology for a P2MP network (shown in FIG. 2B). Frames transmitted inside a STXOP are separated by inter-frame gaps (IFG).

During IFG the medium is idle. Accordingly, FIG. 3 also shows a time period indicative of the duration of a minimum idle time interval forming a minimum Inter-Frame Gap (IFG_MIN) between two subsequent frame sequences. Moreover, the TSs scheduled within the STXOP 305 form a grid of transmission opportunities. Each TS in the grid 307 serves as a placeholder, reserving an opportunity for the nodes associated with this TS to transmit.

As discussed above, the described MAC scheduling techniques divide sharing of STXOP 305 between SDM devices, which further allocate the transmission slots among the various CPEs. Thus, the nodes sharing STXOP 305 are SDMs in this case. The TSs are allocated to the SDMs for transmission to the CPEs. The particular schedule detailing the order in which a particular SDM utilizes its assigned portion of the STXOP 305, is defined by the MAP. The schedule for sharing the STXOP follows the grid 307 of TSs shown in FIG. 3. The defined schedule, and the corresponding grid of TSs 307, is determined according to TS assignment rules advertised in the MAP corresponding to STXOP 305. In an embodiment, a node to which a TS is allocated, utilizes the time slot as an opportunity to transmit data, or passes the TS on to a different node. The case of a passed time slot is depicted in diagram 300 by a short TS block in the grid 307 and a straight line during the associated time periods 310, 315, 320 in the grid, indicating that that no transmission of traffic was conducted in that TS. If a TS is utilized, the next TS will start subsequently to the respective minimal inter frame gap IFG_MIN following the TS. In the event that a TS is not utilized, the next TS starts after the unutilized TS. In either instance, nodes that are associated with the next TS in the grid sequence are granted the opportunity to transmit in that TS.

Time period 310 illustrates an example of a MAC schedule as it is implemented by the particular source node, namely node$_1$ (shown in FIG. 2B). In time period 310, the SDM waits for its allocated portion of the STXOP 305 in order to transmit data, as the frame becomes available, to the designated CPE in a corresponding TS. During time period 310, a downstream transmission of data is scheduled between source node$_1$ (an SDM) and a destination node$_5$ (i.e., DEVICE_ID_DST=5) representing one of its supported CPEs. As noted above, the data is received from a backbone network in a format that is compliant with the backbone network protocols, and suitably is converted to a format that is compliant with P2MP transmission over the P2MP network coupling using P2MP resource allocations depicted in timing diagram 300, in an embodiment. At the time when a frame is ready for transmission to the destination node (represented by the shorter arrow), the node is required to initially wait for a time period (represented by the oval placeholder) that is associated with the IFG_MIN where the medium is idle. After IFG_MIN has expired, a TS allocated for node$_1$ is scheduled. Thus, the start of transmission begins (represented by the longer arrow) from node$_1$ (SDM) to node$_5$ (CPE). After the TS for transmission has elapsed, in the example depicted, it is determined that there is no traffic on the network to be transmitted to this destination node for the span of multiple sequential TSs in the grid 305 (represented by the straight line in time period 310). Consequently, the source node$_1$ passes on its corresponding transmission opportunities to another node until an additional frame is ready to be transmitted to node$_5$ in time period 310 (represented by the shorter arrow). However, the traffic becomes ready during a TS that is allotted for the other SDM, node$_0$. Again, the source node$_1$ is required to wait (represented by the oval placeholder) for an appropriately assigned transmission opportunity. Subsequent to another IFG_MIN waiting period, the next occurring TS that is assigned by the DM to node$_1$ (SDM) is scheduled. Accordingly, the source node$_1$ can initiate another transmission from node$_1$ to node$_5$ during this TS in time period 310. For the remaining TSs within the STXOP 305, as it relates to time period 310, no traffic destined for node$_5$ (CPE) is sensed by the network (represented by the straight line).

Time period 315 illustrates an example of a MAC schedule as it is implemented by an SDM specified as source node$_0$ (shown in FIG. 2B). During the time period 315, the SDM determines that data is ready for transmission to a designated CPE, but the shared medium is currently utilized by another SDM. The SDM waits for its allocated portion of the STXOP 305 in order to assign a TS for the designated CPE. According to the described MAC scheduling techniques, the amount of time in which the SDM waits in this scenario is reduced, as the STXOP is divided between one other SDM, rather than each CPE supported in the domain. During time period 315, a downstream transmission is scheduled between source node$_0$ and another destination node$_3$ (i.e., DEVICE_ID_DST=3) representing one of its supported CPEs. It is determined, during the initial TSs of the grid sequence within STXOP 305, that no traffic on the network is destined for node$_3$ (represented by the straight line in time period 315). Frames become ready for transmission to node$_5$ during time period 315 (represented by the shorter arrow), but the currently scheduled TS at this point in the grid, is assigned to the other SDM, namely node$_1$. Accordingly, the node waits for a time period extending until the next TS allocated for node$_0$ occurs (represented by the rounded box). Transmitting to node$_5$ commences at the start of the next TS that is appropriately scheduled for node$_0$ (represented by the longer arrow). It should be noted that prior to the start of transmission, the source node$_0$ waits for a IFG_MIN to elapse, ensuring the appropriate gap between its frames and frames transmitted in the previous TS for node$_1$. For the remaining TSs within the STXOP 305, as it relates to time period 315, no traffic destined for node$_3$ (CPE) is sensed by the network (represented by the straight line).

Time period 320 illustrates an example of a MAC schedule as it is implemented by source node$_0$ (shown in FIG. 2B) for another one of the CPEs coupled thereto, that is designated to receive data. During time period 320, the SDM determines that data is ready for transmission for a designated CPE during its allocated portion of the STXOP 305, but waits in order to assign a TS within that section of the STXOP to the designated CPE (the shared medium is currently utilized to transmit to another CPE). However, the amount of time in which the SDM waits in order for an opportunity to assign a TS to another CPE is reduced, as the STXOP are dividing among SDMs, rather than each CPE. During time period 320, downstream transmissions are scheduled between the same source node as time period 315, node$_0$ and another destination node$_4$ (i.e., DEVICE_ID_DST=4) representing one of its supported CPEs. During the initial TSs within STXOP 305, no traffic on the network is destined for node$_4$ (represented by the straight line in time period 320). A frame that is destined for node$_4$ becomes ready for transmission (represented by the short arrow), but it is during a TS that is already being utilized for transmitting frames to another destination node, that is node$_3$. Therefore, destination node$_4$ is required to wait (represented by an oval placeholder) for a subsequent TS allocated for its managing SDM, or node$_0$. Transmitting to node$_4$ begins at the start of the next TS scheduled for node$_0$ (represented by the longer arrow), which is after the IFG_MIN associated with the previous TS. At the end of transmission within the TS, there is no further traffic for this destination node$_4$ for a number of consecutive TSs within the STXOP 305 (represented by the straight line in time period 320). Thereafter, another frame is detected as being ready for transmission to destination node$_4$. The node waits (represented by an oval placeholder in time period 320) for the next TS in the grid sequence that is allocated for source node$_0$. During this TS, the SDM, which is source node$_0$ starts to transmit to destination node$_4$ (represented by longer arrow in time period 320). At the end of the TS, transmission between the nodes ends. For the remaining TSs within the STXOP 305, as it relates to time period 320, no traffic destined for destination node$_4$ is sensed by the network (represented by the straight line).

FIG. 3 illustrates that waiting time experienced by nodes within the SXTOP 305 is substantially less than transmission time, where nodes are utilizing the network resources. The MAC scheduling techniques described realizes a solution that allows an increase in the number of nodes supported in a network using G.hn technology, while reducing delays associated with other approaches (e.g., assigning slots to multiple domains using multiple DMs).

Figure 4:
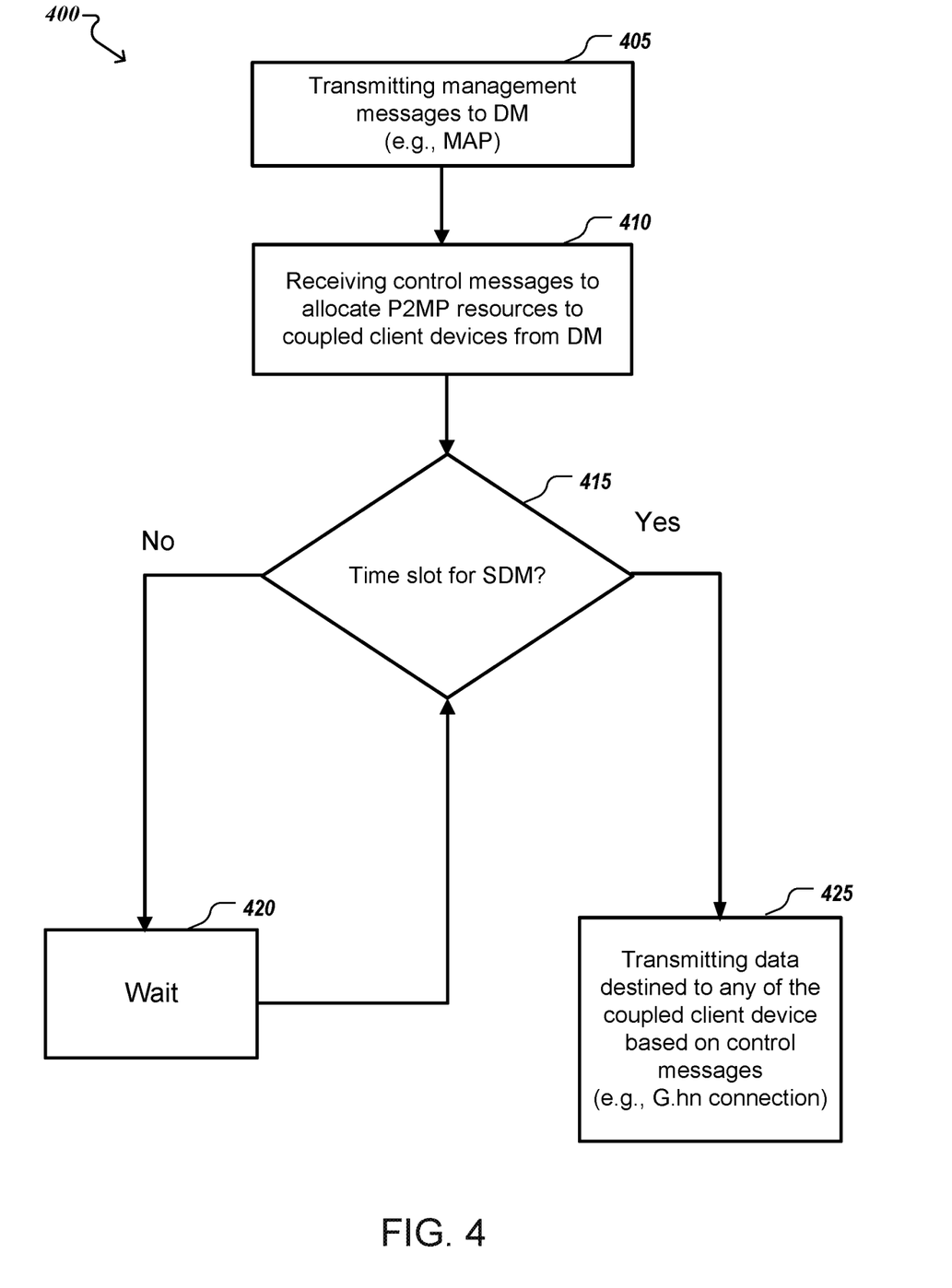
FIG. 4 shows a flow diagram of an example of a process for data transmission within a hybrid P2MP network using G.hn technology including the SDM role.

FIG. 4 shows a flow chart of an example of a process 400 for data transmission within a hybrid P2MP network using G.hn technology including the SDM role. As an example, the process is implemented within the hybrid P2MP as described in detail with reference to FIG. 1. Accordingly, the network includes one DM controlling the domain, and one or more SDMs responsible for supporting at least one CPE coupled thereto. Additionally, in an embodiment, the DM directly supports at least some CPEs in addition to supporting SDM devices. The process 400 begins with a SDM being admitted by the DM as a node within the network domain. At operation 405, a SDM intending to join the domain transmits management messages to a DM, in order to be allowed to register to join the domain. As discussed in detail in reference to FIG. 1, control/management messages, such as registration requests, are transmitted between SDMs and the DM using a control path implemented using G.hn technology, in an embodiment.

In accordance with the techniques described relating to the SDM role, adding SDMs to the network domain also controls scalability and governs the number of nodes supported by the network (e.g., each additional SDM additionally connects multiple CPEs). The management messages are used to perform the admission procedure with the DM, for instance to register the SDM with the DM. Accordingly, transmitting involves the SDM sending its registration messages to the DM. Moreover, in response to the SDM being registered to the domain, the DM distributes a MAP for all nodes registered to a domain, for example by transmitting MAP frames. The SDM receives the MAP defining STXOPs that are split into predefined time slots corresponding to a transmission time scheduled for a node, as described in detail in reference to FIG. 2A. In the techniques described, management and MAC signaling is communicated between the SDM and DM (e.g., no data communication between the DM and SDMs). In an embodiment, operation 405 involves communicating all of the control/management messages by using G.hn connections between SDMs and the DM.

In the embodiments, network traffic is characterized as being of a type from two categories: (i) data traffic that is generally comprises data frames used for communicating user data, and (ii) control/management traffic that is generally comprises control/management frames being used for managing and controlling the network devices and resources, and further for assisting in the delivery of data frames. The control/management traffic is communicated using control paths between DMs and SDMs in accordance with G.hn compliant specifications. Data traffic is communicated using data paths between DM/SDMs and CPEs or between DM/SDMs and the backbone of the network, utilizing G.hn compliant specifications or Ethernet compliant specifications respectively.

At operation 410, the SDM receives control messages, from the DM, in order to allocate resources to multiple CPEs, or client devices. In some cases, at the device level within the same domain, management and control messages are exchanged between the DM and SDMs. In accordance with the techniques and systems described, the SDM allocates G.hn connections to its CPEs using its own resources, rather than DM resources. The control messages facilitate communications between nodes via these connections.

At operation 415, a check is performed to implement MAC scheduling techniques described in detail with reference to FIG. 2A and FIG. 3. In some implementations, the check is performed after it is determined that a frame associated with a SDM is ready for transmission. The check, at operation 415, is used to determine whether a current TS, for instance within the STXOP defined in the received MAP, is assigned to the SDM. The DM defines the STXOPs of the MAC cycle, assigning TSs to the one or more SDMs registered to the domain, in an embodiment. If the TS is not assigned to the SDM (shown in FIG. 4 as the "No" branch), then at operation 420, the SDM waits for an appropriate transmission opportunity in a subsequent TS. If the TS is assigned to the SDM (shown in FIG. 4 as the "Yes" branch), then an opportunity for the SDM to start transmitting is present. The particular SDM that has been assigned to the TS either uses the opportunity to start transmitting during the TS, or passes the opportunity to transmit to the next assigned node, namely another SDM or DM, defined in the MAP, for instance in the case where there is no data for transmission.

At operation 425, the SDM uses the TS to transmit data destined to one of its supported end nodes, or CPEs, based on the previously received control messages and as assigned by the DM in the MAP, in an embodiment. As an example, transmission involves the SDM providing a G.hn connection to the respective CPE using its allocated resources (e.g., buffers, queues, and memories) to transmit data downstream to the CPE. It is noted that in an embodiment, the data is received at the SDM from the backbone network in a format that is compliant with the backbone network, is converted to a format that is compliant with the P2MP segment of the of a hybrid P2MP network and subsequently is transmitted over the P2MP network coupling according to network time and or resource allocations for a P2MP network transmission, as received in a P2MP control message. Process 400 employs SDMs for communicating to multiple CPEs, without having to repeat transmission of the traffic through the DM. Thus, the techniques described realize a solution that increases the maximum number of nodes supported in a hybrid P2MP network, for example, without negatively impacting the throughput and latency of the network. This is due to the STXOP being shared among all of the network nodes implemented within the HE device (DM and SDMs), thus the time is not wasted by defining different Contention Free TXOPs (CFTXOP) which requires waiting until the time period for an unused CFTXOP has expired.

A few embodiments have been described in detail above, and various modifications are possible. The disclosed subject matter, including the functional operations described in this specification, are typically implemented in electronic circuitry, computer hardware, firmware, software, or in combinations of them. In some implementations, structural means disclosed in this specification and structural equivalents thereof, are typically implemented including potentially a program operable to cause one or more data processing apparatus to perform the operations described (such as a program encoded in a computer-readable medium, which is be a memory device, a storage device, a machine-readable storage substrate, or other physical, machine-readable medium, or a combination of one or more of them).

While this disclosure contains many specifics, these should not be construed as limitations on the scope of what may be claimed, but rather as descriptions of features that may be specific to particular embodiments. For example, details are provided with regard to G.hn implementations. However, the systems and techniques described herein are capable of being suitably employed in various systems using home networking technology standards such as ITU T G.9960, G.hn-MIMO (G.9963), and the like.

Various features that are described in this specification in the context of separate embodiments are also suitably implemented in combination in a single embodiment. Conversely, various features that are described in the context of a single embodiment are also suitably implemented in multiple embodiments separately or in any suitable subcombination. Moreover, although features may be described above as acting in certain combinations and even initially claimed as such, one or more features from a claimed combination is in some cases be excised from the combination, and the claimed combination may be directed to a subcombination or variation of a subcombination.

Other embodiments fall within the scope of the following claims.

What is claimed is:

1. A network device, comprising:
   a plurality of ports coupling the network device to two or more client devices via a point-to-multipoint (P2MP) network coupling;
   a control path receiver configured to receive control messages from a domain master (DM) network device coupled to the network device, the control messages being received over a network connection that is different from the P2MP network and defining a shared resource allocation for the P2MP network, the network device configured to communicate with the two or more client devices over the P2MP network coupling based on the received control messages;
   a data path receiver configured to receive data from a backbone network coupled to the P2MP network coupling to form a hybrid P2MP network, the received data designating a destination client device to receive the data and being arranged in a format that is compliant with a backbone communication protocol; and
   a data path transmitter configured to transmit, based on the control messages, the received data to the designated client device through the P2MP network coupling in accordance with a P2MP communication protocol using a resource allocation received in the control message.

2. The network device of claim 1, further comprising:
   processing circuitry configured to process the received control messages, wherein the received control messages are received from the DM network device in a G.hn compliant control message format.

3. The network device of claim 2, wherein the processing circuitry is further configured to determine allocation of resources provided by the network device based on the received control messages in order for the network device to communicate with the two or more client devices over the P2MP network coupling.

4. The network device of claim 1, further comprising:
   processing circuitry configured to process the received control messages, wherein the received control messages are received from the DM network device in an Ethernet compliant control message format.

5. The network device of claim 4, wherein the processing circuitry is further configured to determine allocation of resources provided by the network device based on the received control messages in order for the network device to communicate with the two or more client devices over the P2MP network coupling.

6. The network of device of claim 1, further comprising:
   an additional port coupling the network device to the DM network device, wherein the DM network device and the network device are both disposed in the same hardware equipment.

7. The network device of claim 1, further comprising:
   an additional data path receiver configured to receive additional data transmitted from a client device of the two or more client devices via the P2MP network coupling in accordance with the P2MP communication protocol; and
   an additional data path transmitter configured to transmit the additional data to the backbone network, the additional data being arranged in a format that is compliant with the backbone communication protocol.

8. The network device of claim 1, wherein:
   the data path transmitter is configured to transmit the received data in accordance with a G.hn compliant communication protocol; and
   the data path receiver is configured to receive the data being arranged in a format that is compliant with an Ethernet compliant communication protocol.

9. The network device of claim 1, further comprising:
   a converter configured to convert the data that is received at the network device according to the backbone communication protocol to the P2MP communication protocol suitable for transmission to a client device via the P2MP network coupling, and to convert data that is received at the network device according to the P2MP communication protocol to a format that is compliant with the backbone communication protocol for transmission over the backbone network.

10. The network device of claim 1, wherein:
    the shared resource allocation includes a Medium Access Plan (MAP) defining shared transmission opportunities that are split into predefined time slots, the predefined time slots comprising a time slot corresponding to a transmission time for transmitting the received data to the designated client device; and
    the data path transmitter is configured to transmit the received data to the designated client device during the time slot.

11. A domain master (DM) network device, comprising:
    a plurality of ports coupling the DM network device to two or more client devices via a point-to-multipoint (P2MP) network coupling;
    an additional port coupling the DM network device to one or more network devices via the P2MP network coupling;
    a control path transmitter configured to transmit control messages to the one or more network devices coupled to the DM network device; and a control path receiver configured to receive control request messages from the one or more network devices coupled to the DM network device, the DM network device configured to establish a connection to the one or more network devices using the additional port and based on the received control request messages;

a data path receiver configured to receive data from a backbone network coupled to the P2MP network to form a hybrid P2MP network, the received data including a designated client device to receive the data and being arranged in a format that is compliant with a backbone communication protocol; and a data path transmitter configured to transmit the received data to the designated client device through the P2MP network in accordance with a P2MP communication protocol using a shared resource allocation in the transmitted control messages.

12. The DM network device of claim 11, wherein:

the control messages comprise a Medium Access Plan (MAP) defining shared transmission opportunities that are split into predefined time slots, the predefined time slots comprising a time slot corresponding to a transmission time for transmitting the received data to the designated client device; and the data path transmitter is configured to transmit the received data to the designated client device during the time slot.

13. The DM network device of claim 11, wherein the control path receiver is configured to receive additional control request messages from a plurality of additional network devices, the DM network device configured to control access by the plurality of additional network devices to use the P2MP network coupling based on the received additional control request messages.

14. The DM network device of claim 11, further comprising:

processing circuitry configured to generate the transmitted control messages, wherein the transmitted control messages are transmitted to the one or more network devices in a G.hn compliant control message format.

15. The DM network device of claim 11, further comprising:

processing circuitry configured to generate the transmitted control messages, wherein the transmitted control messages are transmitted to the one or more network devices in an Ethernet compliant control message format.

16. A method, comprising:

receiving, by a network device, control messages from a domain master (DM) network device, the control messages specifying resource allocations for communicating with two or more client devices over a P2MP network coupling, the control messages being received by the network device from the DM network device over a network connection that is different than the P2MP network coupling;

receiving, by the network device, data from a backbone network coupled to the P2MP network coupling, the received data designating a client device to receive the data and being arranged in a format that is compliant with a backbone communication protocol; and transmitting, by the network device, the received data to the designated client device based on the control messages through the P2MP network coupling in accordance with a P2MP communication protocol using a resource allocation received in the control message.

17. The method of claim 16, wherein receiving, by the network device, the control messages comprises receiving the control messages from the DM network device in a G.hn compliant control message format.

18. The method of claim 16, wherein receiving, by the network device, the control messages comprises receiving the control messages from the DM network device in an Ethernet compliant control message format.

19. The method of claim 16, further comprising:

determining allocation of resources provided by the network device based on the received control messages in order for the network device to communicate with the two or more client devices over the P2MP network coupling.

20. The method of claim 16, further comprising:

receiving additional data transmitted from a client device of the two or more client devices via the P2MP network coupling in accordance with the P2MP communication protocol; and transmitting the additional data to the backbone network, the additional data being arranged in a format that is compliant with the backbone communication protocol.

21. The method of claim 20, further comprising:

converting the additional data that is received according to the P2MP communication protocol to a format that is compliant with the backbone communication protocol for transmission over the backbone network.

22. The method of claim 16, wherein:

receiving, by the network device, the data from the backbone network comprises receiving data arranged in a format that is compliant with an Ethernet compliant communication protocol; and transmitting, by the network device, the received data to the designated client device comprises transmitting the received data in accordance with a G.hn compliant communication protocol.

23. The method of claim 16, further comprising:

converting the data that is received at the network device according to the backbone communication protocol to the P2MP communication protocol suitable for transmission to a client device via the P2MP network coupling.

24. The method of claim 16, wherein:

the resource allocations include a Medium Access Plan (MAP) defining shared transmission opportunities that are split into predefined time slots, the predefined time slots comprising a time slot corresponding to a transmission time for transmitting the received data to the designated client device; and transmitting, by the network device, the received data to the designated client device comprises transmitting the received data to the designated client device during the time slot.

25. A method, comprising:

receiving, by a domain master (DM) network device, control request messages from one or more network devices;

establishing a connection via a point-to-multipoint (P2MP) network coupling to the one or more network devices based on the received control request messages;

transmitting, by the DM network device, control messages to one or more network devices via the connection;

receiving data from a backbone network coupled to the P2MP network coupling, the received data including a designated client device to receive the data and being arranged in a format that is compliant with a backbone communication protocol; and transmitting the received data to the designated client device through the P2MP network coupling in accordance with a P2MP communication protocol using a resource allocation in the transmitted control messages.

26. The method of claim 25, wherein:

transmitting, by the DM network device, the control messages comprises transmitting a Medium Access Plan (MAP) defining shared transmission opportunities that are split into predefined time slots, the predefined time slots comprising a time slot corresponding to a transmission time for transmitting the received data to the designated client device; and transmitting the received data to the designated client device comprises transmitting the received data to the designated client device during the time slot.

27. The method of claim 25, further comprising:

receiving additional control request messages from a plurality of additional network devices; and controlling access by the plurality of additional network devices to use the P2MP network coupling based on the received additional control request messages.

28. The method of claim 25, wherein transmitting, by the DM network device, the control messages comprises transmitting the control messages to the one or more network devices in a G.hn compliant control message format.

29. The method of claim 25 wherein transmitting, by the DM network device, the control messages comprises transmitting the control messages to the one or more network devices in an Ethernet compliant control message format.

\* \* \* \* \*